US006983077B2

(12) United States Patent
Yamazaki (10) Patent No.: US 6,983,077 B2
(45) Date of Patent: Jan. 3, 2006

(54) IMAGE PROCESSOR (75) Inventor: Tsutomu Yamazaki, Odawara (JP)

(73) Assignee: Minolta Co., Ltd., Osaka (JP)

( * ) Notice: Subject to any disclaimer, the term of this patent is extended or adjusted under 35 U.S.C. 154(b) by 668 days.

(21) Appl. No.: 09/820,640

(22) Filed: Mar. 30, 2001

(65) Prior Publication Data

US 2001/0055426 A1 Dec. 27, 2001

(30) Foreign Application Priority Data

Mar. 30, 2000 (JP) .............................. 2000-093962

(51) Int. Cl.
*G06K 9/40* (2006.01)
(52) U.S. Cl. .................................... 382/266
(58) Field of Classification Search ........ 382/173–176, 382/189, 199, 266–269, 274–275, 254–259, 382/202; 358/532, 1.9–2.1; 348/565, 576
See application file for complete search history.

(56) References Cited

U.S. PATENT DOCUMENTS

| 4,855,934 | A | * | 8/1989 | Robinson | .................... | 345/582 |
| 4,878,178 | A | * | 10/1989 | Takakura et al. | ........... | 345/589 |
| 5,101,448 | A | * | 3/1992 | Kawachiya et al. | ........ | 382/287 |
| 5,293,471 | A | * | 3/1994 | Ikeuchi et al. | .............. | 345/443 |
| 5,841,905 | A | * | 11/1998 | Lee | ............. | 382/203 |
| 5,862,257 | A | * | 1/1999 | Sekine et al. | ............... | 382/199 |
| 5,870,103 | A | * | 2/1999 | Luo | ............ | 345/630 |
| 6,005,680 | A | * | 12/1999 | Luther et al. | ................ | 358/2.1 |
| 6,181,437 | B1 | * | 1/2001 | Sawada | ...................... | 358/1.9 |

FOREIGN PATENT DOCUMENTS

| JP | 05-020495 | 1/1993 |
| JP | 05-134651 | 5/1993 |
| JP | 09-091371 | 4/1997 |

* cited by examiner

*Primary Examiner*—Jose L. Couso
*Assistant Examiner*—Tom Y. Lu
(74) *Attorney, Agent, or Firm*—Buchanan Ingersoll PC (57) ABSTRACT

In an image processor, a first converter extracts a line image region in input bit map image data and converts the line image to vector data, while a second converter converts bit map data of pixels in the input bit map image data around the line image of the line image region based on the bit map data of pixels around the line image region. Then, a composer composes the vector data of the line image obtained by the first converter and the bit map data converted by the second converter.

8 Claims, 9 Drawing Sheets

IMAGE PROCESSOR

This application is based on application No. 2000-93962 filed in Japan, the contents of which are hereby incorporated by reference.

BACKGROUND OF THE INVENTION

1. Field of the Invention

The present invention relates to image processing on a document including different types of images.

2. Description of Prior Art

A document may include different types of images such as characters, line images, pictures and characters not recognized. It is known to process different types of images separately and to compose them to integrate a document image. For example, bit map images are generated from character codes, from characters not recognized and from non-character images and they are composed (Japanese patent laid open publication 9-91371/1997). In another way, in order to use rounded characters, character images are modified without using font of the rounded characters, and they are composed with the other image (Japanese patent laid open publication 5-134651/1993). In a different way, when an image data is converted to another image data of a different format, regions of characters, line images and pictures are converted in different forms at the same time, and the image is reconstructed (Japanese patent laid open publication 5-20495/1993).

In an image processing system, different types of regions are separated from bit map data obtained by scanning a document. Character regions are converted to code data with optical character recognition, line image regions are converted to vector data, and the other regions are processed as bit map data. Then, these data are composed and the resultant integrated image is outputted. However, the images may not be composed fitly in the integrated image. For example, when vector data are generated, the precision of the position of the edited image may not be correct sufficiently. Therefore, when vector data are composed with the original image, the original image is superposed around the vector data, so that a blurred image may be outputted. For example, in an image wherein colors are different at both sides of a straight line, the image around the straight line may be blurred, or in an image including a bit map image enclosed with vector data, the boundary thereof may be blurred.

SUMMARY OF THE INVENTION

An object of the present invention is to provide an apparatus and method for composing pictures of different types fitly.

An image processor according to the invention comprises a first converter which extracts a line image region in input bit map image data and converts the line image to vector data, a second converter which converts bit map data of pixels in the input bit map image data around the line image of the line image region based on the bit map data of pixels around the line image region, and a composer which composes the vector data of the line image obtained by said first converter and the bit map data converted by said second converter.

An advantage of the present invention is that a bit map image including a line image can be reproduced without position shift in an image processor wherein line image regions in input bit map data are converted to vector data.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
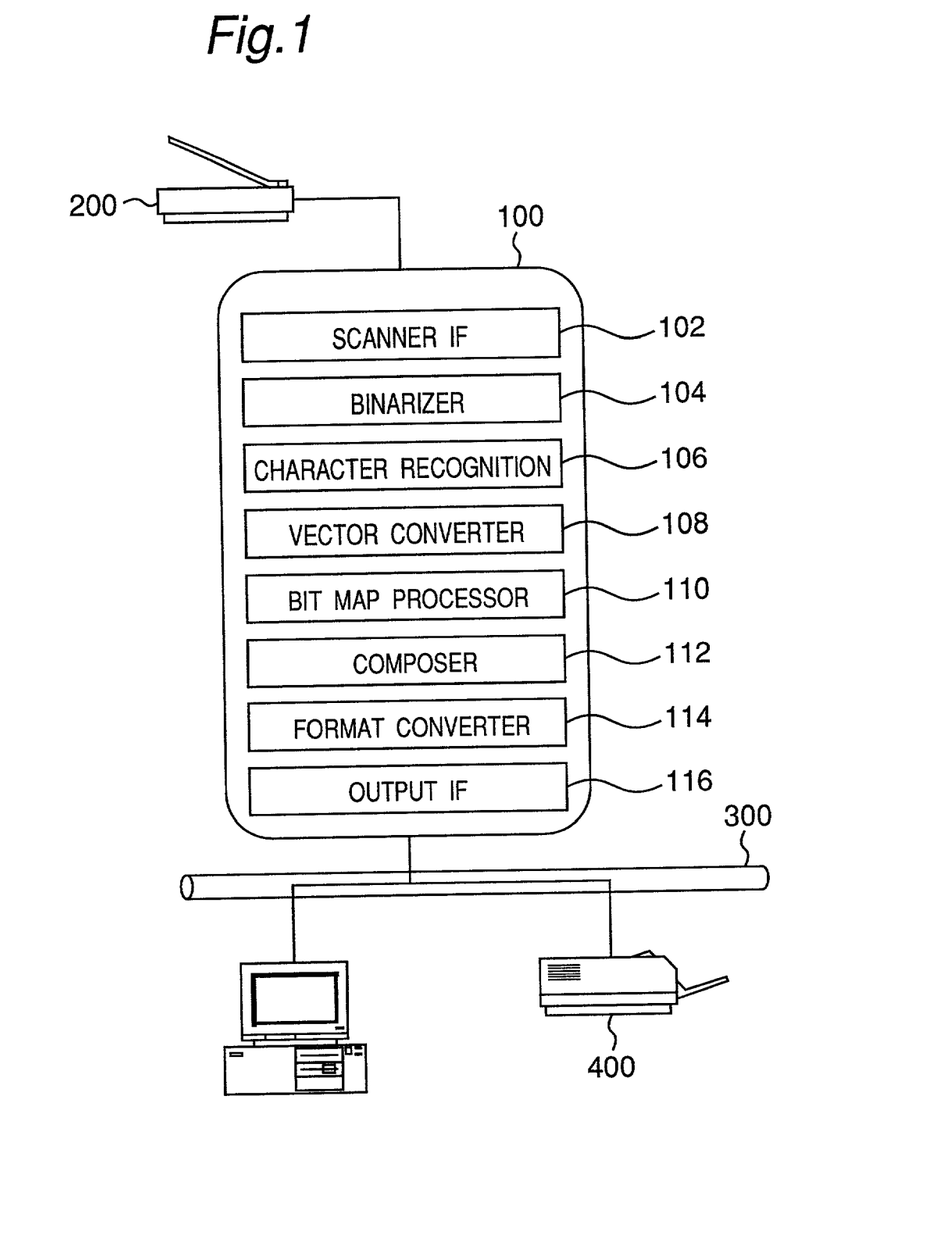
FIG. 1 is a diagram on a system including a scanner and an image processor.

Referring now to the drawings, wherein like reference characters designate like or corresponding parts throughout the several views, FIG. 1 shows an image processor 100. The image processor 100 receives image data read by a scanner 200 and sends print data of the image data via a network 300 to a printer 400. In the image processor 100, a scanner interface 102 receives color bit map image data (multi-level data) of red, green and blue from the scanner 200. Then, character regions, line image regions and picture regions in the bit map image data are processed differently. The image processor 100 has components such as a scanner interface 102, a binarizer 104, a character recognition device 106, a vector converter 108, a bit map processor 110, a composer 112, a format converter 114 and an output interface 116. These components will be explained later.

Figure 2:
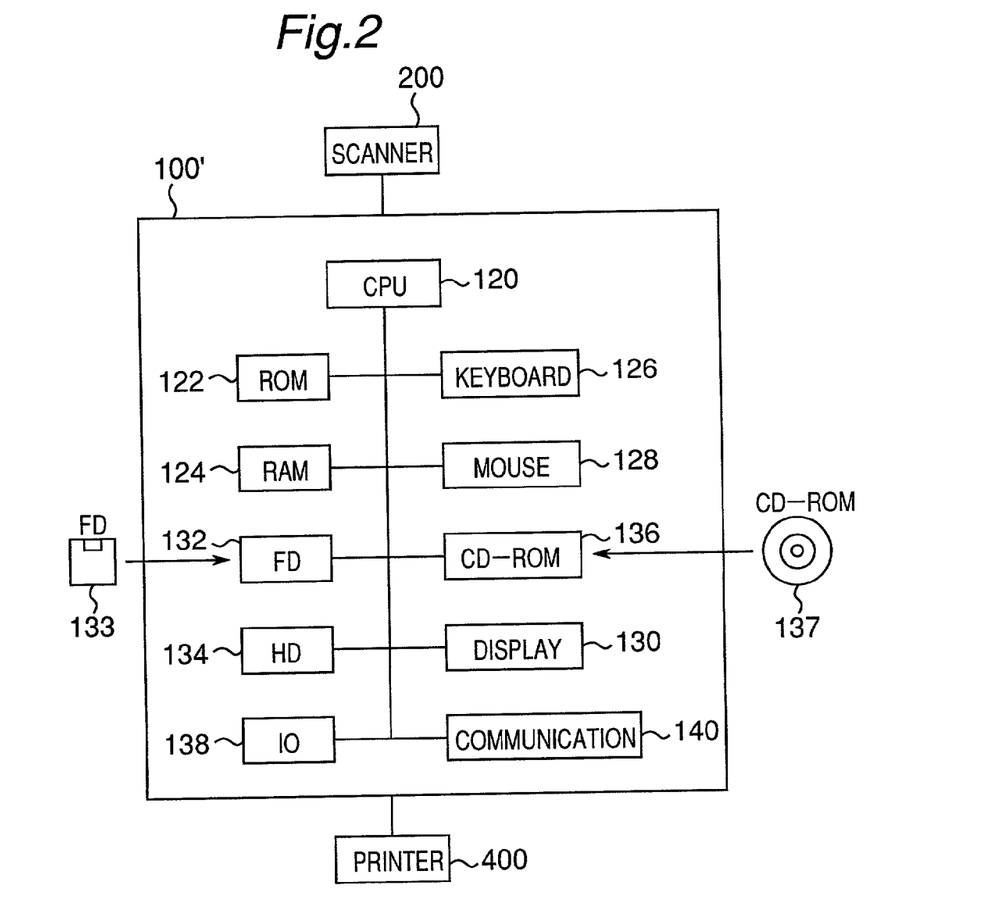
FIG. 2 is a block diagram of a modified example of the image processor.

The image processing in the components 104 to 114 may be performed by dedicated hardware circuits. In another way, it may be performed by a software program of image processing by a computer such as a personal computer or a work station, which uses an image processing software program for image processing. For example, as shown in FIG. 2, a CPU 120 controls the computer 100', and it has a read only memory 122, a flush memory (not shown) or the like for storing a program or the like, a random access memory 124 used as a work area, and a keyboard 126 and a mouse 128 as input means, and a display device 130. The CPU 120 is also connected to storage devices such as a flexible disk drive 132 for accessing a flexible disk 132, a hard disk drive 134 for accessing a hard disk (not shown) and a CD-ROM drive 136 for accessing a CD-ROM 137. A program for image processing may be stored in one of the recording media. The CPU 120 is also connected to an input/output device 138 (used as the scanner interface) and a communication device 140 (used as the output interface). The image processing program stored in one of recording media is read and written to the RAM 124, and the CPU 120 executes the image processing program in the RAM 124. This modified example is not explained further below.

Figure 3:
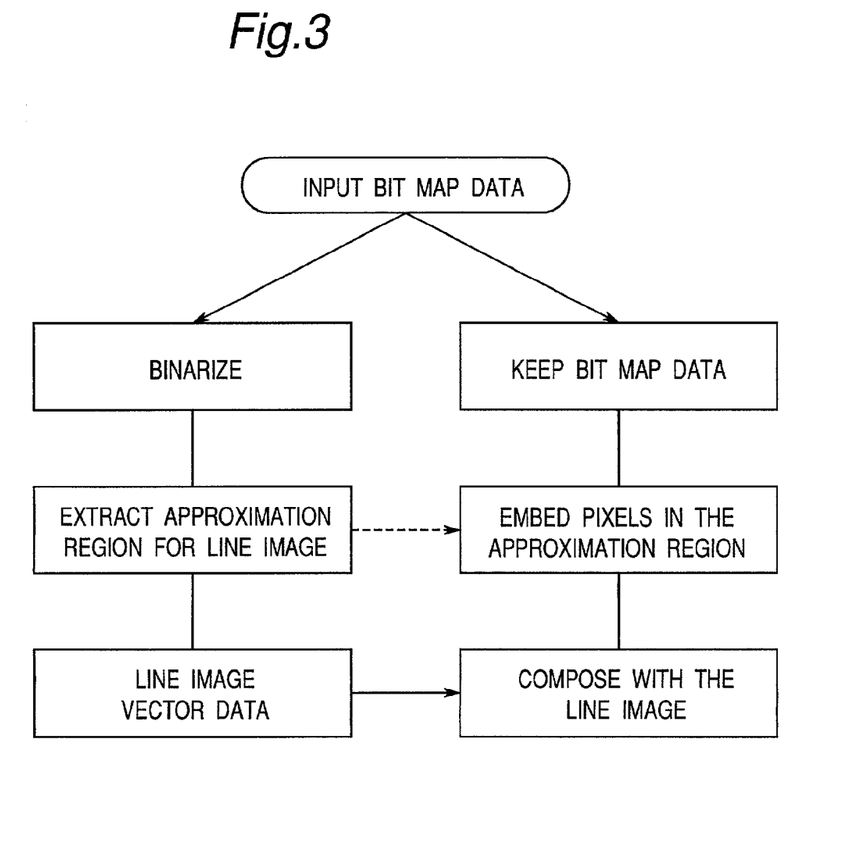
FIG. 3 is a diagram for explaining the image data processing.

Image data are processed by the image processor 100 as follows. FIG. 3 is provided to understand the image processing explained below. First, character regions are processed to recognize characters as follows. The binarizer 104 binarizes the input color bit map image data and sends the bi-level image to the character recognizer 106. The character recognizer 106 extracts character regions from the input bi-level image data, performs optical character recognition on the character regions and stores the obtained character data including character codes, region position data and character attribute. Then, the character recognizer 106 sends to the vector converter 108 the image data on the character regions obtained by deleting and approximating the image data, as well as the input color bit map image data. Next, line image regions are processed. In a vector converter 108, line image regions (or regions approximated as line images) are extracted from the bi-level image data and are converted and stored to vector data including start point, end point, vector type, line width and line attribute. On the other hand, the color bit map image data in the line image regions is approximated, and the resultant color bit map image data are sent to the bit map processor 110. The approximation will be explained later. Finally, the color bit map image data are processed. The bit map processor 110 divides the data into regions and extracts picture regions. Then, for each of the extracted picture regions, the region is discriminated and the data is approximated, and the obtained bit map data including position of the picture region and color bit map image data are stored on the extracted picture regions.

In the composer 112, the magnifying factor of each image is changed, and a bit map image of characters obtained from the character data, a bit map image obtained from the vector data and a picture image obtained from the bit map data are composed. Then, the format converter 114 converts the composed image to a predetermined format and outputs the result via an output interface 114 to the printer 400.

In the above-mentioned image processing, the color bit map image data obtained by the scanner 200 are divided into regions. In the character regions, character data are determined with optical character recognition. Then, vector data are obtained on line image regions. In the other regions, bit map data are obtained. Then, the three kinds of data are composed and outputted. In the processing, a line image having background is converted to vector data by the vector converter 108. On the other hand, as to the background of the line image approximated as vector data and regions thereabout, the original pixel data of the background are not adopted as the bit map image data of the background, while the approximation is performed based on data of pixels around the line image. For example, as to a line image of color bit map image data and pixel data of the regions around the line image, bit map image is approximated by the pixels at the regions around the line image, and the line image defined by the vector data is composed therewith. Therefore, position shift or mismatching between background and vector data becomes unnoticeable, irrespective of the precision of approximated position. On the other hand, the color of background is likely changed at the boundary line of a straight line, an arc, an enclosed image or the like. Then, the pixel data to be approximated is selected according to a side relative to the approximated line where the pixel to be deleted exists.

Figure 4:
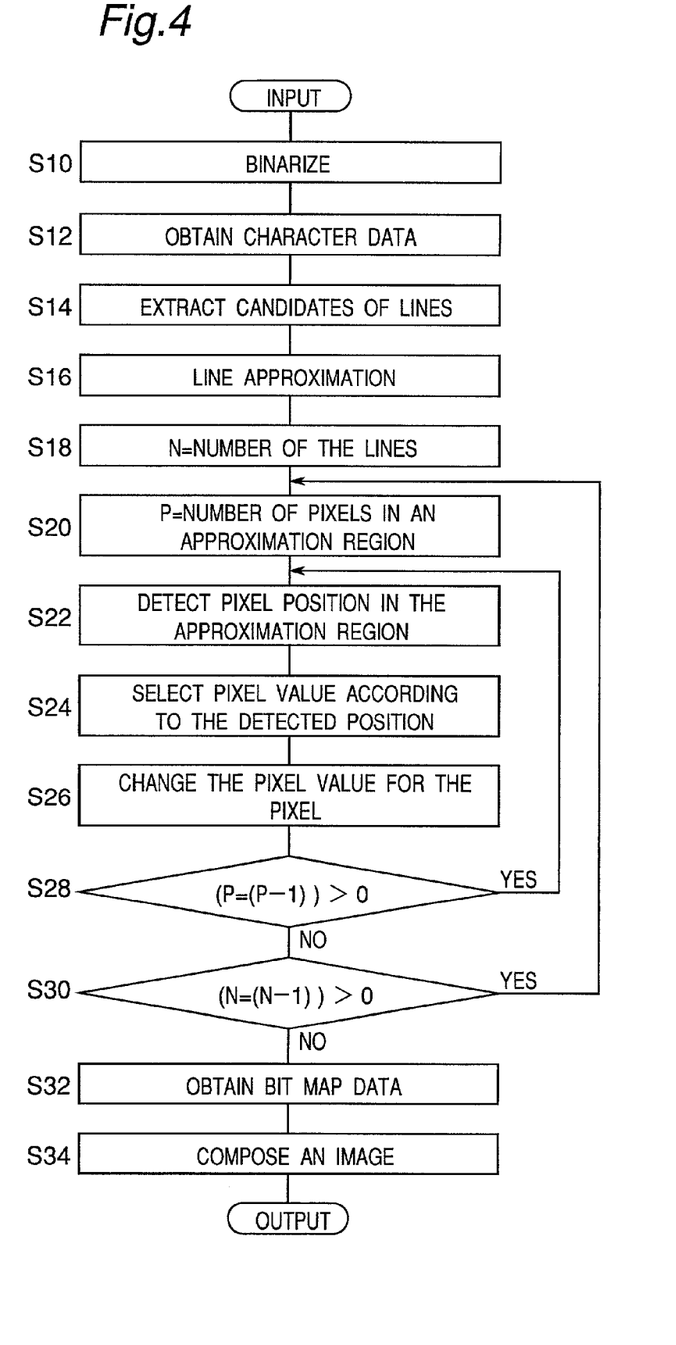
FIG. 4 is a flowchart of image synthesis.
Figure 5:
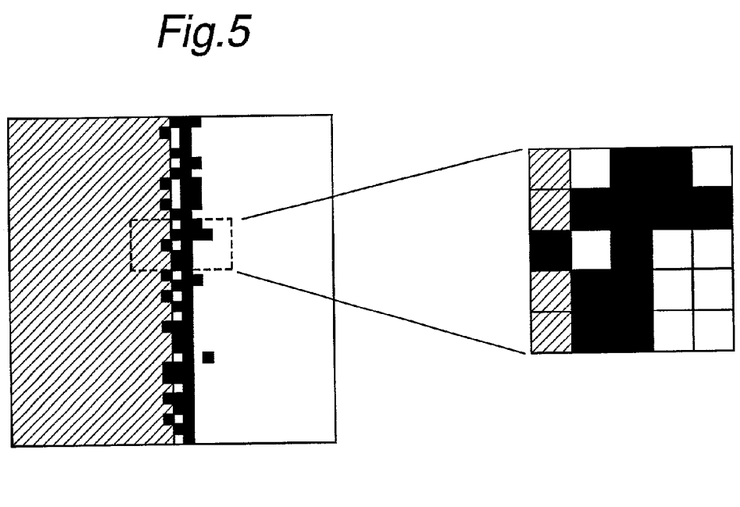
FIG. 5 is a diagram of an example of an input bit map image.
Figure 6:
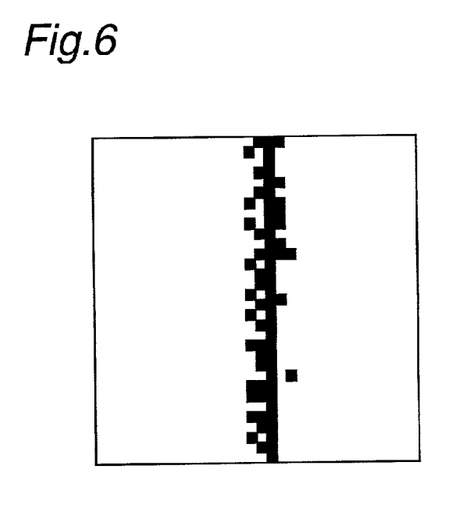
FIG. 6 is a diagram of an example of a bi-level image.

Next, the image composition of various types of images is explained according to the flowchart shown in FIG. 4 of the image processor 100. The processing of a straight line is explained as a type of line image. First, the RGB color bit map image data is received from the scanner 200, and the input image data is subjected to binarization for vector conversion to generate bi-level image data while keeping the color bit map image data (S10). FIG. 5 shows an image scanned on a document having different colors of background at two sides of a straight line, or a boundary, as an example of the input bit map image. FIG. 6 shows bi-level image at the boundary shown in FIG. 6. If a character region exists, though not shown in the drawings, the above-mentioned optical character recognition is performed on the bi-level image in the character region to determine character data (S12).

Figure 7:
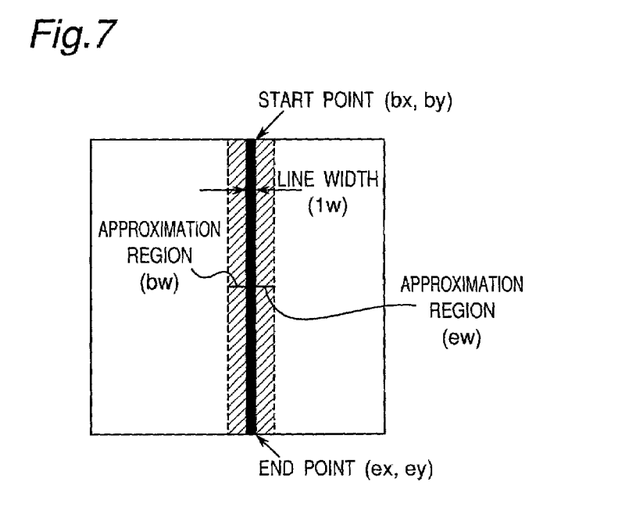
FIG. 7 is a diagram of an example of vector data.

Next, line image is processed. Candidate pixels to be approximated as a straight line are extracted (S14), and they are approximated as a straight line (S16). FIG. 7 shows an example of vector data obtained from the bi-level image shown in FIG. 6, that is, line width, lw, starting point (bx, by), and end point (ex, ey) of a straight line, and width ew, bw of the approximation region at the right and left sides of the straight line. The approximation of straight line may be performed by known technique such as Hough conversion or least square method.

A table (Table 1) is generated on the vector data of the start point, the end point, the line widths and the region approximated based on the bi-level image. In the image shown above, only one straight line is included. If a plurality of straight lines exist, the table includes vector data of the plurality of obtained straight lines.

TABLE 1

Vector data table

| Straight line | Start point | | End point | | Line width | Approximation region | |
| --- | --- | --- | --- | --- | --- | --- | --- |
| | bx | by | ex | ey | lw | bw | ew |
| 1 | 10 | 50 | 10 | 150 | 5 | 10 | 10 |
| 2 | 60 | 50 | 60 | 150 | 5 | 10 | 10 |
| 3 | 110 | 50 | 110 | 150 | 5 | 10 | 10 |
| 4 | 160 | 50 | 160 | 150 | 5 | 10 | 10 |
| ... | ... | ... | ... | ... | ... | ... | ... |
| ... | ... | ... | ... | ... | ... | ... | ... |
| ... | ... | ... | ... | ... | ... | ... | ... |
| N | bx[N] | by[N] | ex[N] | ey[N] | lw[N] | bw[N] | ew[N] |

Figure 8:
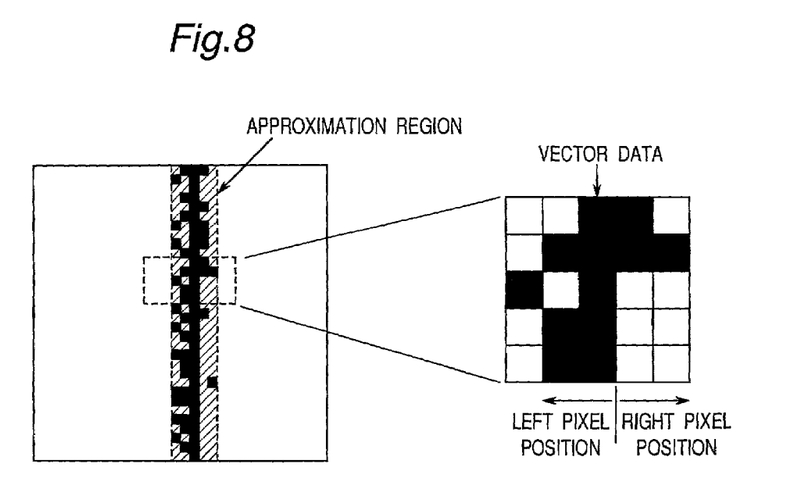
FIG. 8 is a diagram of position detection.
Figure 9:
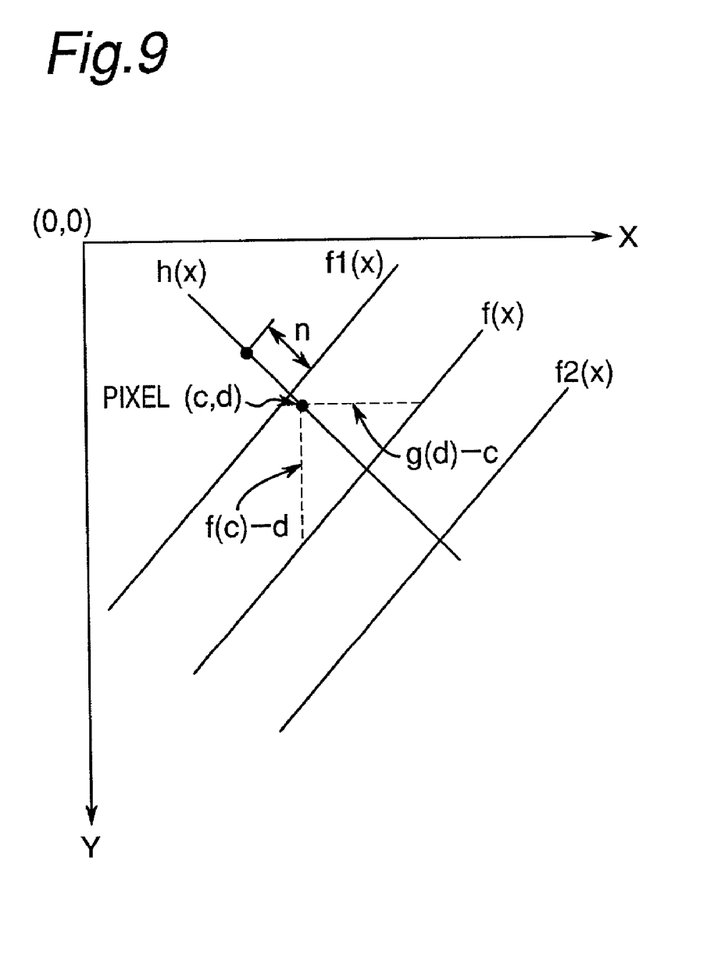
FIG. 9 is a diagram for explaining a position for embedding.
Figure 10:
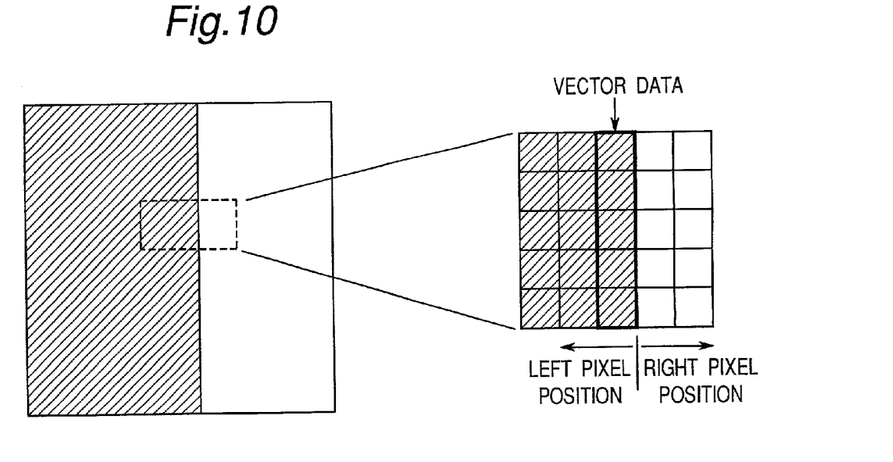
FIG. 10 is a diagram of an example of a bit map image after the embedding.

Next, the number of straight lines is set to N (S18), and each of the N lines is processed as follows. For the bit map image data, P is set to the number of pixels in an approximation region approximated as a straight line in the bit map image data (S20). Then, for each of the pixels in the approximation region, the pixel position, that is, a side relative to the straight line at which the object pixel exists, is detected (S22). FIG. 8 shows an example of detection of pixel position. For example, as shown in FIG. 9, straight lines approximated are represented as functions f(x), g(y), the position of pixel (c, d) is at the minus side if the signs of f(c)-d, g(d)-c are all positive and at the plus side if the signs are all negative. Next, the pixel value is selected according to the detected pixel position (S24) and is embedded at the object pixel at the above position in the bit map image (S26). At this step, a pixel to be approximated is selected according a side relative to the approximated line where the object pixel exists. For example, in order to determine the value to be embedded for pixel (c, d), a straight line h(c) is determined to extend through the pixel (c, d) perpendicularly to the approximated line. If the pixel position detected at step S20 is the minus direction, a boundary straight line f1(x) of the approximation region at the minus direction is determined, and as to a pixel distant by predetermined value n from the crossing point of f1(x) and h(x) in the minus direction of h(x), the value of the pixel is set to the value for embedding. Then, P is decremented (S28), and the flow returns to step S22. The above processing is repeated for all the pixels to determine the values to be embedded. FIG. 10 shows an example of a bit map image after the embedding. It is apparent that position shift between the approximated line and the background color does not appear. Next, N is decremented (S30), and the flow returns to step S20. Thus, the above processing is repeated for all the straight lines. It is to be noted that the embedding is performed similarly for the pixels at which the straight line exists.

Figure 11:
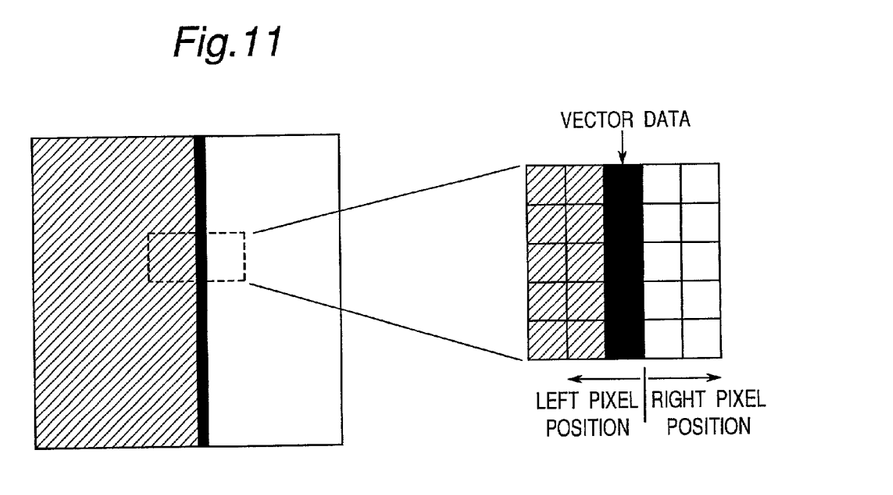
FIG. 11 is a diagram of an example of a composed image.

Next, the above-mentioned bit map data are obtained on the regions other than the character and line image regions (S32). Finally, the bit map data, vector data and character data are composed to form an integrated image (S34). Then, it is converted to a general format which can deal with bit map image, vector image and character image, and the converted image is outputted. By approximating the color bit map image data as explained above, the bit map image fits with the position of an approximated line of the line image at boundaries of line images, and color shift around the boundaries is prevented. FIG. 11 shows an example of a composed image. By composing the bit map image approximated in FIG. 10 with the vector image of a straight line defined by vector data, mismatching between the straight line and the background is prevented, as shown in FIG. 11.

In the above example, approximation as straight line is explained on a line image region. However, approximation as an arc, Bezier curve or the like can be processed similarly.

Further, the approximation is applied to a closed region filled with a color, and position mismatching can be prevented.

Figure 12:
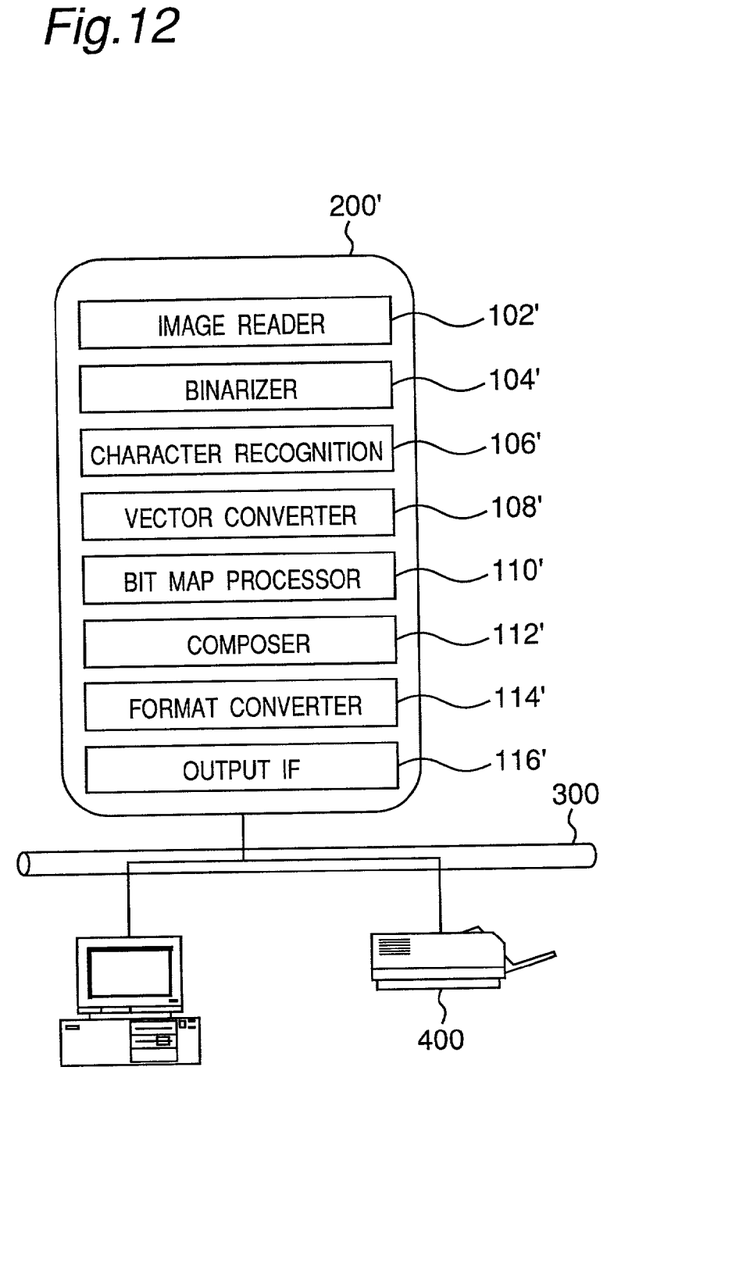
FIG. 12 is a diagram of a modified example of a system including a scanner.

FIG. 12 shows a modified system for the above-mentioned image processing. In this system, a scanner 200' has an image reader section 102' where a document is scanned to obtain output bit map data of the document. Further, the scanner 200' includes components such as a binarizer 104', a character recognition device 106', a vector converter 108', a bit map processor 110', a composer 112', a format converter 114' and an output interface 116'. The bit map data obtained by the image reader section 102' is sent to the binarizer 104'. The components 104' to 114' are similar to the counterparts shown in FIG. 1, and they are not explained here again.

As explained above, line image data represented as vector data are composed with bit map images approximated around the line image regions. Then, an image having different colors at both sides of a straight line or the like, or an image around a boundary between an image of enclosed line and an bit map image in the enclosed line can be reproduced, without position shift.

By converting character regions to character codes and line image regions to vector data, while keeping bit map data in the other regions, the memory capacity for image data is decreased, and processing of the image data with a computer becomes easier. Further, because the line images can be reproduced as raster data by raster image processing in a print controller, characters and line images would not be affected by noises on reading or by resolution. Then, image quality of a copy is as good as that of an original print.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processor comprising:
    a first converter which extracts a line image region in input bit map image data and converts the line image to vector data;
    a second converter which detects a side where a target pixel in pixels exists relative to the line image region defined by the vector data and converts a value of the bit map data of the target pixel according to a value of the input bit map data around the line image region of the detected side; and
    a composer which composes the vector data of the line image obtained by said first converter and the bit map data converted by said second converter.

2. The image processor according to claim 1, further comprising a character recognizer which recognizes characters in the input bit map data and converts the recognized characters to character codes, wherein said composer composes character data based on the character codes with the vector data and the bit map data.

3. The image processor according to claim 1, wherein the vector data obtained by said first converter and the bit map data converted by said second converter are stored separately in a storage device, and said composer composes the bit map data and the vector data stored in the storage device.

4. The image processor according to claim 1, wherein the pixels around the line image region are pixels far from the line image by a predetermined distance.

5. The image processor according to claim 4, wherein the distance is along a direction perpendicular to the line image.

6. The image processor according to claim 1, wherein said image processor further comprises an image reader device which reads a document and provides the input bit map data of the document to said first and second converters.

7. A method of image processing comprising the steps of:
    extracting a line image region in input bit map image data;
    converting the line image to vector data;
    detecting a side where a target pixel in pixels exists relative to the line image region defined by the vector data;
    converting a value of the bit map data of the target pixel according to a value of the input bit map data around the line image region of the detected side; and
    composing the vector data of the line image obtained and the obtained bit map data.

8. A storage medium, which can be read by a computer, the storage medium storing a program which comprises instructional steps of:
    extracting a line image region in input bit map image data;
    converting the line image to vector data;
    detecting a side where a target pixel in pixels exists relative to the line image region defined by the vector data;
    converting a value of the bit map data of the target pixel according to a value of the input bit map data around the line image region of the detected side; and
    composing the vector data of the line image obtained and the obtained bit map data.

* * * * *